(12) United States Patent
Cao et al.

(10) Patent No.: US 8,219,971 B2
(45) Date of Patent: Jul. 10, 2012

(54) SYSTEM AND METHOD FOR SOURCE CODE SECTIONAL LOCKING FOR IMPROVED MANAGEMENT

(75) Inventors: Andrew H. Cao, Round Rock, TX (US); Danny Y. Chen, Austin, TX (US); Rick A. Hamilton, II, Charlottesville, VA (US); Fabian F. Morgan, Austin, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 11/841,503

(22) Filed: Aug. 20, 2007

(65) Prior Publication Data

US 2009/0055799 A1    Feb. 26, 2009

(51) Int. Cl.
*G06F 9/44* (2006.01)
(52) U.S. Cl. ...................................................... 717/110
(58) Field of Classification Search ........................ None
See application file for complete search history.

(56) References Cited

U.S. PATENT DOCUMENTS

| | | | |
|---|---|---|---|
| 5,623,659 A * | 4/1997 | Shi et al. ................................ | 1/1 |
| 5,809,503 A | 9/1998 | Aoshima | |
| 2002/0170048 A1* | 11/2002 | Zgarba et al. ................. | 717/168 |
| 2003/0179230 A1* | 9/2003 | Seidman ........................ | 345/750 |
| 2007/0033654 A1* | 2/2007 | Wilson ............................ | 726/27 |
| 2008/0052290 A1* | 2/2008 | Kahn et al. ........................ | 707/8 |

* cited by examiner

*Primary Examiner* — Wei Zhen
*Assistant Examiner* — Adam R Banes
(74) *Attorney, Agent, or Firm* — John Pivnichny; Roberts Mlotkowski Safran & Cole, P.C.

(57) ABSTRACT

A system and method of managing source code and, more particularly, a system and method for locking sections of source code to eliminate conflicts during concurrent use by multiple users. The method includes locking a first section of a file and at least a second section of the file to permit editing thereof by different users to the exclusion of other users. The method further includes merging edits of the locked first section with remaining sections of the file including any edits made to the at least second section without overwriting any edits.

25 Claims, 3 Drawing Sheets

SYSTEM AND METHOD FOR SOURCE CODE SECTIONAL LOCKING FOR IMPROVED MANAGEMENT

FIELD OF THE INVENTION

The invention generally relates to a system and method for managing source code and, more particularly, to a system and method for locking sections of source code to eliminate conflicts during concurrent use by multiple users.

BACKGROUND OF THE INVENTION

Source code (commonly just source or code) is any sequence of statements and/or declarations written in some human-readable computer programming language. Programming languages are artificial languages that can be used to control the behavior of a machine, particularly a computer. More specifically, a programming language is used to write computer programs, which instruct a computer to perform some kind of computation, and possibly control external devices.

Programming languages, like human languages, are defined through the use of syntactic and semantic rules, to determine structure and meaning, respectively. However, programming languages differ from natural languages in that natural languages are only used for interaction between people, while programming languages also allow humans to communicate instructions to machines. As such, programming languages differ from most other forms of natural languages in that they require a greater degree of precision and completeness.

To ensure that the program is complete, precise and accurate, software development projects employ hundreds of software developers to write and edit the program code. In such cases, it is common for multiple software developers to work on a program code at the same time such as, for example, editing different or the same sections of the program code. However, two or more users can overwrite each other's work when they attempt to change the same file at the same time, thus resulting in loss of work and hence productivity. This is typically a problem for centralized revision control systems.

Known revision control systems attempt to eliminate the risk of one user overwriting the work of another user. However, the known revision control systems have their own shortcomings. For example, known revision control systems prevent "concurrent access" problems by simply locking all of the files so that only one user at a time has write access to the central "repository" copies of the files. Other revision control systems such as Concurrent Versions Systems (CVS), allow multiple users to edit the same file at the same time, but provide facilities to merge changes later. In the CVS type system, the concept of a reserved edit can provide an optional mechanism to explicitly lock a file for exclusive write access, even though a merging capability exists.

The known file locking can provide some protection against difficult merge conflicts when a user is making radical changes to many sections of a large file (or group of files). But in the known filing locking systems other users can simply bypass the revision control software and change the files locally. That can lead to more serious problems. For example, in merging systems, mass changes by a single user can cause code conflicts and overwrite problems.

Accordingly, there exists a need in the art to overcome the deficiencies and limitations described hereinabove.

SUMMARY OF THE INVENTION

In a first aspect of the invention, a method comprises locking a first section of a file and at least a second section of the file to permit editing thereof by different users to the exclusion of other users. The method further comprises merging edits of the locked first section with remaining sections of the file including any edits made to the at least second section without overwriting any edits.

In another aspect of the invention, a method is provided for deploying a source code management tool. The method comprises providing a computer infrastructure operable to: lock a first section of a file when a predetermined attribute of the file is empty; permit concurrent locking of other sections of the file by other users; and save all edits of the first locked section and the other locked sections without overwriting any edits.

In another aspect of the invention, a system comprises a computing infrastructure containing executable code operable stored on at least one of a hardware and software component for managing source code. The at least one hardware and software component is configured to concurrently lock different sections of a file containing source code when a predetermined attribute is empty thereby permitting editing of the locked sections by different users while eliminating overwrites or conflicts with sections of the file being concurrently edited.

In another aspect of the invention, a computer program product comprising a computer usable medium having readable program code embodied in the medium is provided. The computer program product includes at least one component to: lock a section of a file to allow editing of the section by a single user to the exclusion of other users; permit concurrent locking of remaining sections of the file such that the other users can concurrently perform editing in the remaining sections of the file, while the section of the file is locked; and merge edits of the locked section with the remaining sections of the file including any sections of the remaining sections which were edited by the other users.

DETAILED DESCRIPTION OF EMBODIMENTS OF THE INVENTION

The invention generally relates to a system and method for managing source code and, more particularly, to a system and method for locking sections of source code to eliminate conflicts during concurrent use by multiple users. By using the system and method of the invention it is possible to eliminate code conflicts and overwrite problems associated with multiple users working on the source code concurrently. The invention can be used over any distributed network, for example, as discussed in more detail below.

Overview of the Invention

The system and method of the invention, in embodiments, provides enhancements (and plug-in capabilities) to centralized revision control systems such as, for example, Configuration Management Version Control (CMVC™) and Rational ClearCase™, both of which are sold and supported by International Business Machines Corporation (IBM). (IBM, ClearCase and CMVC are trademarks of IBM in the United States and throughout the world.)

CMVC is a software package that performs software version control and software configuration management functions. ClearCase is a software tool for revision control of source code and other software development assets. ClearCase forms the base of version control for many large and medium sized businesses and can handle projects with hundreds or thousands of users.

In more particularly, in implementation, the system and method of the invention enables users to lock sections of a file so that other users may work concurrently on other sections of the same file. In embodiments, the locking occurs at checkout and the unlocking and accepting of changes occurs at check-in of the file after editing. In accordance with the invention, during the locking, the revision control system and method maintains information about which users have reserved sections of a file, and provides the mechanism for Integrated Development Environments (IDEs) to respond to the sectional locks.

The system and method of the invention provides advantages over current file lock systems as it allows more users to work on a file concurrently without overwriting the work of other users, or having to wait too long before a file becomes available. The system and method further provides advantages over current merging systems as it alleviates the problem of mass changes by a single user, which can cause code conflicts and overwrite problems.

System Environment

Figure 1:
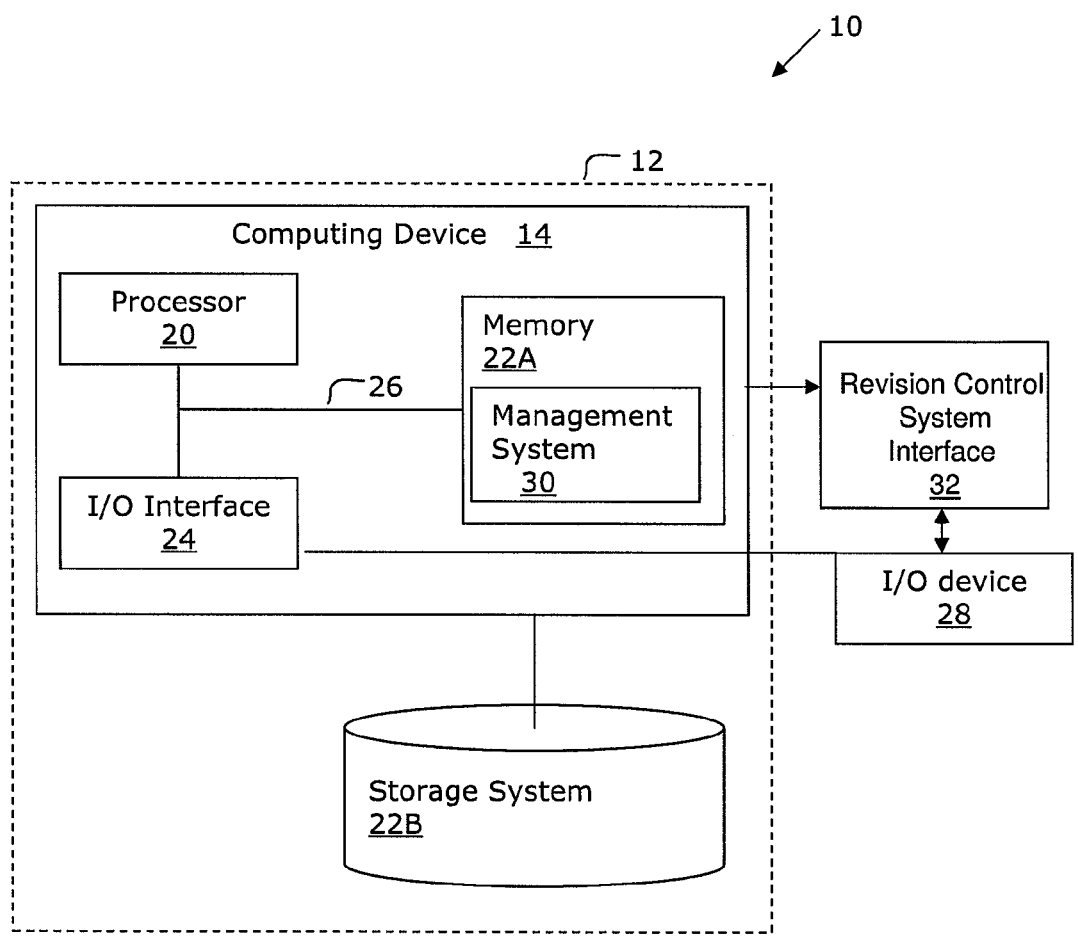
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to allow multiple users to work on different sections of the same file concurrently while eliminating code conflicts and overwrite problems, e.g., process described herein. The management system 30 enhances known IDEs, allowing them to respond to sectional locks as discussed in greater detail below. The computing device 14 shown in FIG. 1 may be provided on any distributed network.

The computing device 14 includes a processor 20, a memory 22A, an input/output (I/O) interface 24, a bus 26 and a revision control system interface 32. The revision control system interface 32 may be part of the user's IDE which enables the user to locate, open and edit a file, e.g., source code. In embodiments, the revision control system interface 32 will display the file, support locking of the file in accordance with the invention, while showing attributes of the locked section of the file. These attributes may include a visual cue of the locked sections, the user(s) working on any of the locked sections, the time the section(s) was locked and/or the length in which it is locked, to name some examples.

The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc, any of which are associated with the user's IDE.

The processor 20 executes computer program code, which is stored in memory 22A and/or storage system 22B. While executing computer program code, the processor 20 can read and/or write data to/from memory 22A, storage system 22B, and/or I/O interface 24. The computer program code is configured to execute the processes described herein. The bus 26 provides a communications link between each of the components in the computing device 14. The I/O device 28 can comprise any device that enables an individual to interact with the computing device 14 and/or IDE and/or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). For the purposes of this description, the article of manufacture can be a computer-usable or computer readable medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the processes of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Illustrative Embodiments of the Invention

In one non-limiting illustrative embodiment, user "A", user "B" and user "C" work on different methods (sections) in a Java file. The users separately locate the Java file in their revision control system interface, and indicate a section of the Java file to lock. To do this, the revision control system interface is enhanced to allow the users to open a file, such as in a text selection mode window, select the section(s) to edit, such as by highlighting the appropriate section, and then choose to lock that section(s), all of which can be implemented by one of skill in the art. In embodiments, the revision control system can parse code grammars, in which case it is configured to present a list of the methods or functions contained in the file for the user to select as an alternative.

In the example, user "A" selects the section that contains a first method for editing, and user "B" and user "C" select other methods for editing. As each user locks a section, the system and method of the invention will highlight (e.g., provide a visual cue such as by disabled text and color) the locked section. In embodiments, each user can be pre-assigned a specific visual cue such as, for example, a specific color. This will provide an indication that the section is locked and is currently being edited, etc. Accordingly, users who later enter the file will easily be able to discern which sections are already locked. Hovering the pointer over a locked section provides a user with information such as which user "owns" the locked section, how long the user has had it locked, and even provide links to other sections that were locked at the same time.

When a section is locked, the revision control system records the lock with the addition of line number or character positions, as an example. So, if user "B" unlocks a locked section by uploading the changed method and declaring it ready for unlock, the revision control system only accepts changes within this locked section(s) by line number or character position, and will merge the now unlocked changes into the correct section of the file regardless of whether user "A" and/or user "B" already merged their changes within the file. The "Revision Control System Program Methodology" section below describes in more detail the locking and unlocking methodology of the invention.

As a further embodiment, the system and method is configured to automatically lock variable declarations that are declared outside locked sections, such as global variables. As should be understood by those of skill in the art, global variables may be variables that are accessible in every scope, i.e., throughout the file. This automatic lock may also be a shared lock such that no user can change the variable declaration until all shared locks are unlocked. Otherwise code logic problems can result.

Revision Control System Program Methodology

Figure 2A:
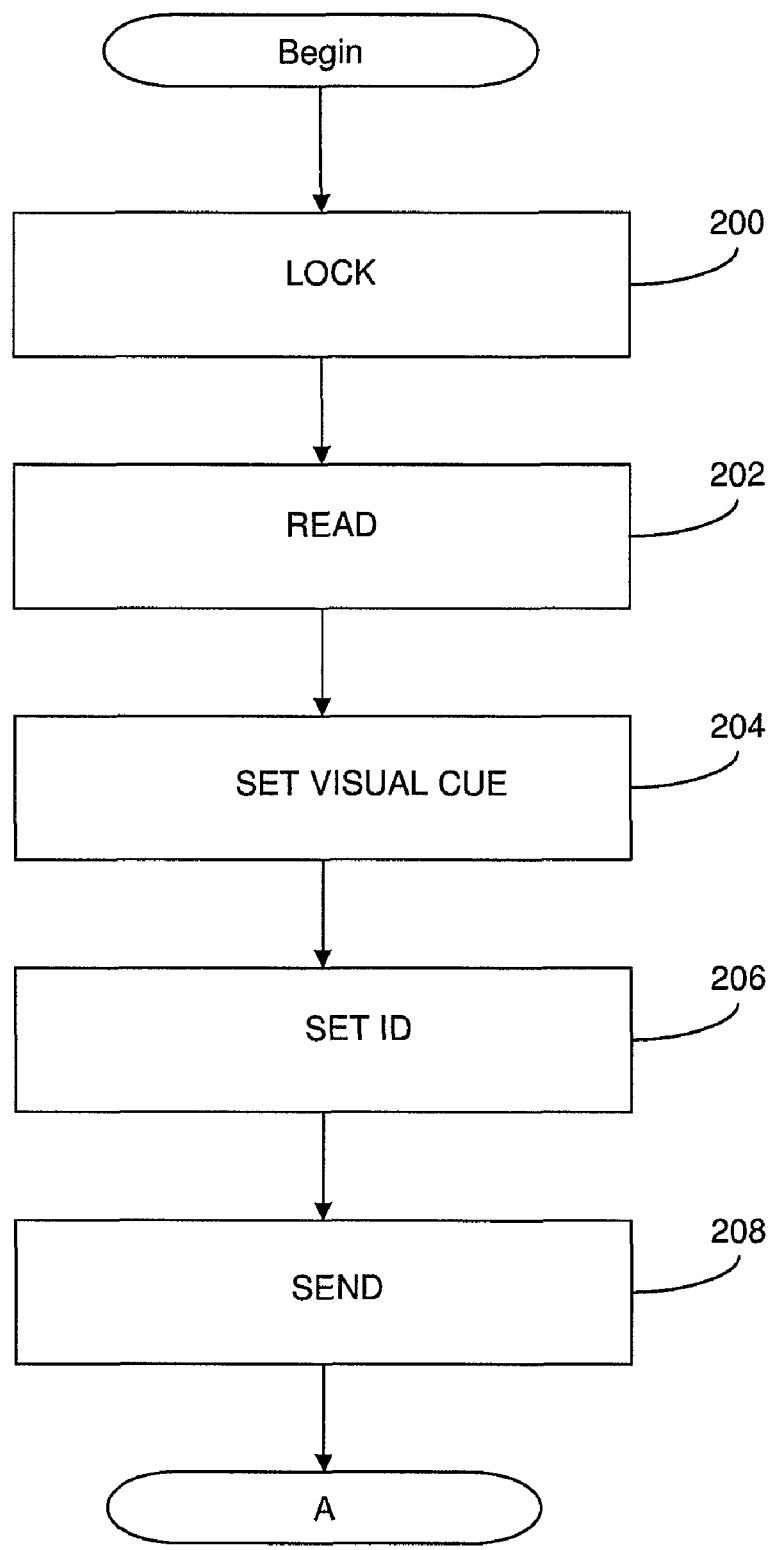
FIGS. 2A and 2B are flow charts of processes for implementing aspects of the invention.
Figure 2B:
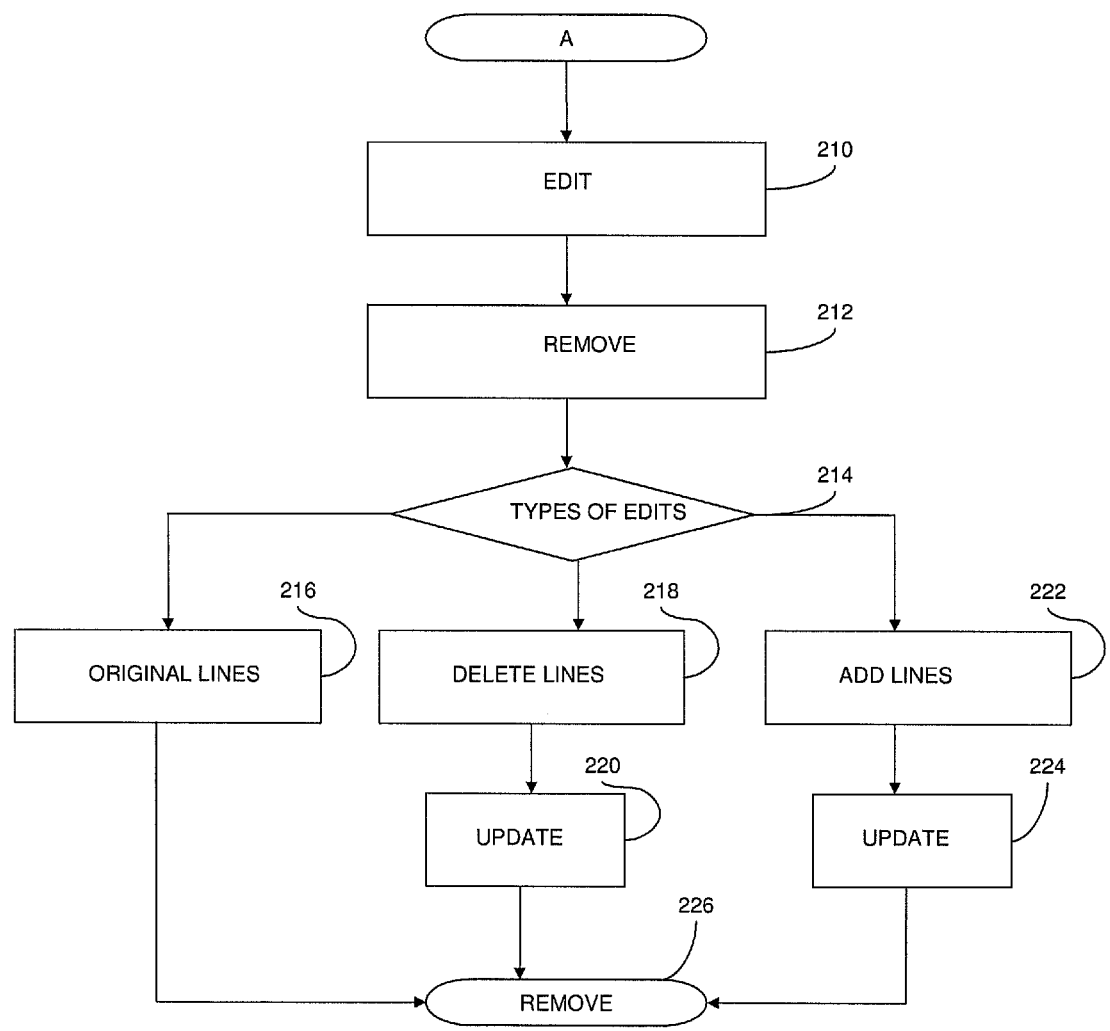

FIGS. 2A and 2B are flow diagrams implementing processes of the invention which may be implemented in the environment of FIG. 1. FIGS. 2A and 2B may equally represent a high-level block diagram of the invention. The processes of FIGS. 2A and 2B may be implemented and executed from either a server, in a client server relationship, or they may run on a user workstation, any of which are associated with the user's IDE.

Additionally, the invention can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system, as discussed above.

Referring to FIGS. 2A and 2B, at step 200, a command is given to lock a particular section of a file. This command may be provided through the interface of the user's IDE which, in turn, will be processed by the management system of FIG. 1, for example.

At step 202, the program reads each line of the locked file into a separate index of a synchronized, resizable array. For example, if the implementation is in Java, the resizable array would be the type "java.util.Vector." In embodiments, the value at each array index is the content of the corresponding line number. Additionally, each index (e.g., line) of the array can have at least one attribute: the UID of the user locking the line or section, time of lock, duration of lock, etc.

In embodiments, at step 204, the resizable array can be serialized into a file that the program's interface uses to determine how to set color (or other distinguishing features) when a file is viewed, based on the different values at each index. The color code or other distinguishing features indicates which sections are locked and, possibly, the ownership of such section. The color coding may be matched with the user's IDE, as discussed in more detail below.

At step 206, for each line of the file that was selected by the user, the program sets the UID attribute of the index corresponding to the line number that was selected. Locking of a particular line (or section) is only permissible if the UID attribute is empty. This will prevent another user from locking the same section.

At step 208, the program sends the file to the user after making additions (and updating the index accordingly), according to user preference or integration with the user's IDE. For example, these additions may include:

Inserting markers, such as XML <hide></hide> tags that the user's IDE will parse. For example, tags may be placed at a locked section to designate a location of a color coding of the locked section. The color code may have associated attributes or information including, for example, the ID of the user locking the section, the time of the lock and the duration of the lock, to name a few.

Inserting visual tags such as ">" characters in front of lines that the user(s) does not have locked. This will show the user which sections are unlocked and accessible to other users.

Not inserting any markers or visual tags, in which case the user is responsible for remembering which sections they may change.

It should be understood by those of ordinary skill in the art that the above additions are examples of implementations of the invention. By way of illustrative example, instead of ">" characters the system and method can insert other characters such as, for example, "*" characters. Likewise, the color code is only one example illustrating a visual cue to the user to readily discern the sections that have been locked using the user's IDE. As another example, though, the section can be highlighted in other manners such as bolding, underlining, etc.

At step 210, the program permits the user to edit the locked section(s). In embodiments, the locked section(s) will only be accessible to the user who locked the section, to the exclusion of other users. This ensures that no other user would have access to this same section, thus preventing conflicts, overwrites, etc. of the edited lines in the locked section(s). At step 212, when the user checks in the code changes, e.g., edits, the value at each index is modified with the updated content, and the UID attribute is cleared. Similarly, any markers or visual tags inserted by the revision control system upon section lock are removed.

In different scenarios, at step 214, a determination is made as to whether the user:
  Modified existing lines in the locked section;
  Deleted lines in the locked section; Added additional lines in the locked section; or
  Modified existing lines in the locked section while either adding or deleting other lines.

At step 216, in the case that the number of updated lines is the same as the original number of lines that were locked, the program would update the content at each index.

At step 218, in the case that the number of updated lines (Nu) is less than the original number of lines (No) that were locked, e.g., some lines were deleted, the program would update the content for the first Nu lines, and remove the array entries for the remaining No-Nu lines. At step 220, any indices that were locked by another user, and greater than the highest index that was locked by the current user (prior to editing), will automatically be updated by the program. This is possible since the array is a synchronized resizable array. As an illustrative, if user "A" deleted lines 198-200 from locked lines 101-200 and user "B" had locked lines 201-300, the program would revise lines 101-200 to 101-197, while updating user "B" lines to 198 to 298.

At step 222, if the number of updated lines (Nu) is greater than the original number of lines (No) that were locked, e.g., some lines were added, the program would update the content for the first No lines, and add new array entries for the remaining Nu-No lines. At step 224, any indices that were locked by another user, and were greater than the highest index that was locked by the current user (prior to editing), will automatically be updated internally by the revision control program. Again, this is possible since the array is a synchronized resizable array. As an illustrative example, if user "A" added lines 201-202 to locked lines 101-200 and user "B" had locked lines 201-300, the program would revise lines 101-200 to 101-202, while updating user "B" lines to 203 to 302.

At step 226, the program will remove markers when the file is uploaded and unlocked.

Client Implementations

In embodiments, the system and method of the invention can enhance existing IDEs. Alternatively, the system and method of the invention can be a plug-in to existing IDEs. In enhancement or plug-in applications, the IDE responds to markers in one of the following user-defined ways:
  By hiding the xml tags;
  By disabling the locked sections, which can be indicated by a visual cue. The visual cue may be an alternate color which matches the colors presented in the revision control system. The disabled or locked sections can be provided as read-only text to other users, while allowing editing for the user locking the section; and/or
  By inserting visual tags such as ">" characters at the start of each non-editable line.

In embodiments of enhanced IDE or plug-in with program (Revision Control Program Server) integration, such as IBM Rational Application Developer and integration with Rational ClearCase or CMVC, the system and method may provide the functionality of the enhanced IDE or plug-in above, without markers. In the embodiment where there are no enhanced IDE or plug-in applications, such as Notepad, Textpad, ConTEXT, etc., the system and method of the invention inserts visual tags such as ">" characters at the start of each non-editable line. The system and method of the invention removes the visual tags when the file is uploaded and unlocked.

While the invention has been described in terms of embodiments, those skilled in the art will recognize that the invention can be practiced with modifications and in the spirit and scope of the appended claims.

What is claimed is:

1. A method, comprising:
  locking a first section of a file and at least a second section of the file to permit editing thereof by different users to the exclusion of other users;
  reading each line of the locked first section into a separate index of a synchronized, resizable array;
  associating at least one attribute to each respective said index; and
  merging edits of the locked first section with remaining sections of the file including any edits made to the at least second section without overwriting any edits,
  wherein each separate index of a plurality of indices comprising the synchronized, resizable array comprises: (i) content for each respective line read of a corresponding line number, and (ii) the at least one attribute, which locks or unlocks only that respective separate index;
  the locking of the first section is only permissible when each respective said index is empty of the at least one attribute; and
  the locked first section includes a viewable attribute that comprises a link to any other locked sections that were locked at a same time as the locked first section.

2. The method of claim 1, wherein the merging includes saving all of the edits of the locked first section and the at least second section.

3. The method of claim 1, further comprising providing a visual cue to the different users indicating a lock.

4. The method of claim 1, wherein the locked first section includes viewable attributes which include at least one of time of the locking, duration of the locking, ownership of the locking and linking to any other locked sections.

5. The method of claim 1, wherein:
  each index includes at least one of a user ID of the user locking the first section;
  the synchronized, resizeable array is serialized to determine a visual cue matched with a user's Integrated Development Environment (IDE).

6. The method of claim 1, further comprising at least one of inserting markers into the first locked section that are parsable by a user's Integrated Development Environment (IDE) and inserting visual tags indicating non-locked sections.

7. The method of claim 1, further comprising determining whether the editing of the locked first section includes at least one of:
  modified existing lines in the first locked section;
  deleted lines in the locked first section; and
  added additional lines in the locked first section.

8. The method of claim 7, wherein one of:
  when a number of updated lines is equivalent to a number of lines in the locked first section prior to editing, the method further comprises updating content at each index of the locked first section; and
  when a number of updated lines (Nu) in the edited locked first section is less than an original number of lines (No) in the locked section prior to editing, the method further comprises updating content for the Nu lines, removing array entries for remaining No-Nu lines and updating remaining lines in other sections; and when a number of updated lines (Nu) in the edited locked first section is greater than an original number of lines (No) in the locked first section prior to the editing, the method further comprises updating content for the No lines, adding new array entries for remaining Nu-No lines and updating remaining lines in other sections.

9. The method of claim 1, wherein the locked first section and the at least second section are read-only sections to the other users.

10. The method of claim 1, wherein the steps of claim 1 are implemented in a computer infrastructure and are at least one of maintained, deployed, supported and created by a service provider.

11. A method for deploying a source code management tool, comprising:
providing a computer infrastructure operable to:
lock a first section of a file;
permit concurrent locking of other sections of the file by other users;
read each line of the locked first section into a separate index of a synchronized, resizable array;
associate a predetermined attribute to each respective said index; and
save all edits of the first locked section and the other locked sections without overwriting any edits,
wherein each separate index of a plurality of indices comprising the synchronized, resizable array comprises: (i) content for each respective line read of a corresponding line number, and (ii) the predetermined attribute, which locks or unlocks only that respective separate index;
the locking of the first section is only permissible when each respective said index is empty of the predetermined attribute; and
the first locked section includes a viewable attribute that comprises a link to any other locked sections that were locked at a same time as the first locked section.

12. The method of claim 11, wherein the computer infrastructure is operable to provide a visual cue indicating the locked sections and the locked sections include viewable attributes including at least one of: time of locking, duration of the locking and ownership of the locking.

13. The method of claim 12, wherein the computer infrastructure is operable to:
insert markers that are parsable by a user's IDE and insert visual tags indicating non-locked sections.

14. The method of claim 13, wherein the computer infrastructure is operable to determine whether editing of the locked first section includes at least one of: modified existing lines; deleted lines; and additional lines.

15. The method of claim 14, wherein:
when a number of updated lines is equivalent to a number of lines in the locked first section prior to editing, the computer infrastructure is operable to update content at each index of the locked first section;
when a number of updated lines (Nu) in the edited locked first section is less than an original number of lines (No) in the locked first section prior to editing, the computer infrastructure is operable to update content for the Nu lines, remove array entries for remaining No-Nu lines and update remaining lines in the other sections; and
when a number of updated lines (Nu) in the edited locked first section is greater than an original number of lines (No) in the locked first section prior to the editing, the computer infrastructure is operable to update content for the No lines, add new array entries for remaining Nu-No lines and update remaining lines in the other sections.

16. The method of claim 11, wherein the computer infrastructure is at least one of maintained, deployed, serviced and updated by a service provider.

17. A system comprising a computing infrastructure containing executable code operable stored on at least one of a hardware and software component for managing source code, the at least one hardware and software component configured to:
concurrently lock different sections of a file containing source code thereby permitting editing of the locked sections by different users while eliminating overwrites or conflicts with sections of the file being concurrently edited;
read each line of the locked different sections into a separate index of a synchronized, resizable array; and
associate at least one attribute to each respective said index,
wherein each separate index of a plurality of indices comprising the synchronized, resizable array comprises: (i) content for each respective line read of a corresponding line number, and (ii) the at least one attribute, which locks or unlocks only that respective separate index;
the locking of the different sections is only permissible when each respective said index is empty of the at least one attribute; and
a locked first section includes a viewable attribute that comprises a link to any other locked sections that were locked at a same time as the locked first section.

18. The system of claim 17, wherein the at least one hardware and software component is configured to:
provide a visual cue indicating the different locked sections;
viewable attributes of the different locked sections; and
determine whether editing of the different locked section includes at least one of: modified existing lines; deleted lines; and additional lines.

19. The system of claim 17, wherein:
when a number of updated lines is equivalent to a number of lines in an edited locked section prior to editing, the at least one hardware and software component is configured to update content at each index of the edited locked section;
when a number of updated lines (Nu) in the edited locked section is less than an original number of lines (No) in the edited locked section prior to editing, the at least one of a hardware and software component is configured to update content for the Nu lines, remove array entries for remaining No-Nu lines and update remaining lines in other sections; and
when a number of updated lines (Nu) in the edited locked section is greater than an original number of lines (No) in the edited locked section prior to the editing, the at least one hardware and software component is configured to update content for the No lines, add new array entries for remaining Nu-No lines and update remaining lines in the other sections.

20. The system of claim 17, wherein the at least one hardware and software component is at least one of maintained, deployed, serviced and updated by a service provider.

21. A computer program product comprising a computer usable memory having readable program code embodied in the computer usable memory, the computer program product includes at least one component to:
lock a section of a file to allow editing of the section by a single user to the exclusion of other users;

permit concurrent locking of remaining sections of the file such that the other users can concurrently perform editing in the remaining sections of the file, while the section of the file is locked;

read each line of the locked section into a separate index of a synchronized, resizable array;

associate at least one attribute to each respective said index; and merge edits of the locked section with the remaining sections of the file including any sections of the remaining sections which were edited by the other users, wherein each separate index of a plurality of indices comprising the synchronized, resizable array comprises: (i) content for each respective line read of a corresponding line number, and (ii) the at least one attribute, which locks or unlocks only that respective separate index;

the locking of the section is only permissible when each respective said index is empty of the at least one attribute; and the locked section includes a viewable attribute that comprises a link to any other locked sections that were locked at a same time as the locked section.

22. The method of claim 1, further comprising providing a visual cue to the different users indicating a lock, wherein:

the providing the visual cue comprises color coding each locked section; and the color coding includes further information including an ID of a user locking a section.

23. The method of claim 22, further comprising:

inserting markers into the locked first section that are parsable by a user's Integrated Development Environment (IDE) and inserting visual tags indicating non-locked sections;

removing the markers and the visual tags when the locked first session is checked in;

clearing the at least one attribute to each respective said index when the locked first section is checked in;

determining whether the editing of the locked first section includes at least one of:

modified existing lines in the locked first section;
deleted lines in the locked first section; and
added additional lines in the locked first section, wherein one of:

when a number of updated lines is equivalent to a number of lines in the locked first section prior to editing, the method further comprises updating content at each index of the locked first section; and when a number of updated lines (Nu) in the edited locked first section is less than an original number of lines (No) in the locked first section prior to editing, the method further comprises updating content for the Nu lines, removing array entries for remaining No-Nu lines and updating remaining lines in other sections; and when a number of updated lines (Nu) in the edited locked first section is greater than an original number of lines (No) in the locked first section prior to the editing, the method further comprises updating content for the No lines, adding new array entries for remaining Nu-No lines and updating remaining lines in other sections;

wherein the at least one attribute is the ID of the user locking the first section; and wherein the markers are the visual cue.

24. The method of claim 1, further comprising locking a variable declaration in the locked first section that is declared outside the locked first section such that the variable declaration is prevented from being edited.

25. The method of claim 24, wherein:

the variable declaration is a global declaration and the locking is a shared locking such that no user can edit the variable declaration until all shared locks are unlocked; and each separate index comprises: (i) text for a respective line read for only a single respective line number; and (ii) the at least one attribute, which is a duration of time for how long the locked first section has been locked.

* * * * *